United States Patent
Schlaudraff et al.

(10) Patent No.: US 11,756,196 B2
(45) Date of Patent: Sep. 12, 2023

(54) METHOD FOR CHECKING A DISSECTION PROCESS IN A LASER MICRODISSECTION SYSTEM AND SYSTEM FOR CARRYING OUT THE METHOD

(71) Applicant: Leica Microsystems CMS GmbH, Wetzlar (DE)

(72) Inventors: Falk Schlaudraff, Butzbach (DE); Christoph Greb, Marburg (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 221 days.

(21) Appl. No.: 17/143,281

(22) Filed: Jan. 7, 2021

(65) Prior Publication Data
US 2021/0217168 A1    Jul. 15, 2021

(30) Foreign Application Priority Data
Jan. 13, 2020   (DE) .................. 102020100587.3

(51) Int. Cl.
*G06K 9/00*  (2022.01)
*G06T 7/00*  (2017.01)

(52) U.S. Cl.
CPC .. *G06T 7/0014* (2013.01); *G06T 2207/10056* (2013.01); *G06T 2207/10148* (2013.01); *G06T 2207/30024* (2013.01)

(58) Field of Classification Search
CPC ..... G01N 2001/284; G01N 2001/2886; G01N 2001/045; G06T 7/0002–0016; G06T 1/0014; G06T 2207/30108–30168; G06T 7/10–136; G06T 2207/10148; G06T 7/001; G06T 7/0014; G06T 7/74; G06T 2207/10056–10061; G06T 2207/30024;
(Continued)

(56) References Cited

U.S. PATENT DOCUMENTS

2002/0048747 A1\* 4/2002 Ganser ................. G01N 1/2813
435/283.1
2002/0056345 A1\* 5/2002 Ganser ................. G01N 1/2813
83/13
(Continued)

FOREIGN PATENT DOCUMENTS

DE    100 18 253 C2    8/2003
DE    102013209880 A1  12/2014
(Continued)

OTHER PUBLICATIONS

Bancroft, John D. and Marilyn Gamble (Ed.): Theory and Practice of Histological Techniques, "Laser Microdissection" chapter, Churchill Livingstone/Elsevier, Dec. 2008, p. 575.

*Primary Examiner* — Atiba O Fitzpatrick
(74) *Attorney, Agent, or Firm* — Leydig, Voit & Mayer, Ltd.

(57) ABSTRACT

A method for checking a dissection process in a laser microdissection system includes carrying out the dissection process for cutting out a dissectate from an object in a first region of the object by a laser beam. First image data is acquired of at least the first region of the object after the dissection process. It is examined whether the first image data has sharp structures within a region to be separated by the dissection process in order to determine whether the dissection process was successful.

18 Claims, 5 Drawing Sheets

(58) Field of Classification Search
CPC ......... G06T 7/0012–0016; G06T 2207/30004; G06V 20/69–698
See application file for complete search history.

(56) References Cited

U.S. PATENT DOCUMENTS

| | | | |
|---|---|---|---|
| 2002/0164678 A1* | 11/2002 | Ganser | G01N 1/04 83/72 |
| 2003/0133190 A1 | 7/2003 | Weiss | |
| 2004/0252291 A1* | 12/2004 | Schutze | G01N 35/00584 356/244 |
| 2007/0066967 A1* | 3/2007 | Sieckmann | G02B 21/365 606/13 |
| 2007/0160280 A1* | 7/2007 | Schutze | G01N 1/2813 382/133 |
| 2014/0335560 A1* | 11/2014 | Baer | G01N 1/2813 435/40.51 |
| 2016/0202040 A1* | 7/2016 | Schlaudraff | G01B 11/14 356/614 |
| 2018/0149561 A1* | 5/2018 | Schlaudraff | G01N 1/2813 |
| 2022/0105590 A1* | 4/2022 | Tatzel | G06T 7/0004 |

FOREIGN PATENT DOCUMENTS

| | | |
|---|---|---|
| EP | 1 276 586 B1 | 8/2005 |
| EP | 1 985 987 B1 | 5/2013 |

\* cited by examiner

METHOD FOR CHECKING A DISSECTION PROCESS IN A LASER MICRODISSECTION SYSTEM AND SYSTEM FOR CARRYING OUT THE METHOD

CROSS-REFERENCE TO PRIOR APPLICATION

Priority is claimed to German Patent Application No. DE 10 2020 100 587.3, filed on Jan. 13, 2020, the entire disclosure of which is hereby incorporated by reference herein.

FIELD

The present invention relates to a method for checking a dissection process in a laser microdissection system and a system for carrying out the same including a control unit, a computer program, and a laser microdissection system.

BACKGROUND

Laser microdissection is a powerful and non-destructive method for obtaining, from specific regions of microscopic samples, individual cells or cell regions which can subsequently be subjected to a plurality of examination techniques. For an overview, reference is made to relevant textbooks, for example the chapter "Laser microdissection" in John D. Bancroft and Marilyn Gamble (publ.), Theory and Practice of Histological Techniques, Churchill Livingstone/Elsevier, 2008, page 575.

In laser microdissection, the cell and tissue morphology and at the same time the macromolecules in the cell are largely retained. The examination of the respective genetic information and of proteins, lipids, metabolites etc. of the cells obtained is therefore possible by corresponding methods. By means of laser microdissection, different microscopic samples can be processed, for example frozen samples, tissue sections embedded in paraffin or plastic, smears of blood and of other body fluids, and cell cultures. In addition to such biological samples, artificial materials or plastics, glass and thin-ground sections of metals or minerals or rock samples can also be processed by laser microdissection. Furthermore, direct dissection of plant parts, such as leaves, grasses, and roots, is possible.

Tissue sections and other samples can be stained by means of known staining techniques, for example with hematoxylin/eosin, or otherwise marked for use in laser microdissection or can be used in the unstained state. In particular, immunohistochemical staining techniques may be used together with fluorochromes or chromogens, or fluorescence in-situ hybridization (FISH) may take place. The staining or marking techniques used also depend on the type of examinations to be carried out subsequently.

SUMMARY

In an embodiment, the present invention provides a method for checking a dissection process in a laser microdissection system. The method includes carrying out the dissection process for cutting out a dissectate from an object in a first region of the object by a laser beam. First image data is acquired of at least the first region of the object after the dissection process. It is examined whether the first image data has sharp structures within a region to be separated by the dissection process in order to determine whether the dissection process was successful.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
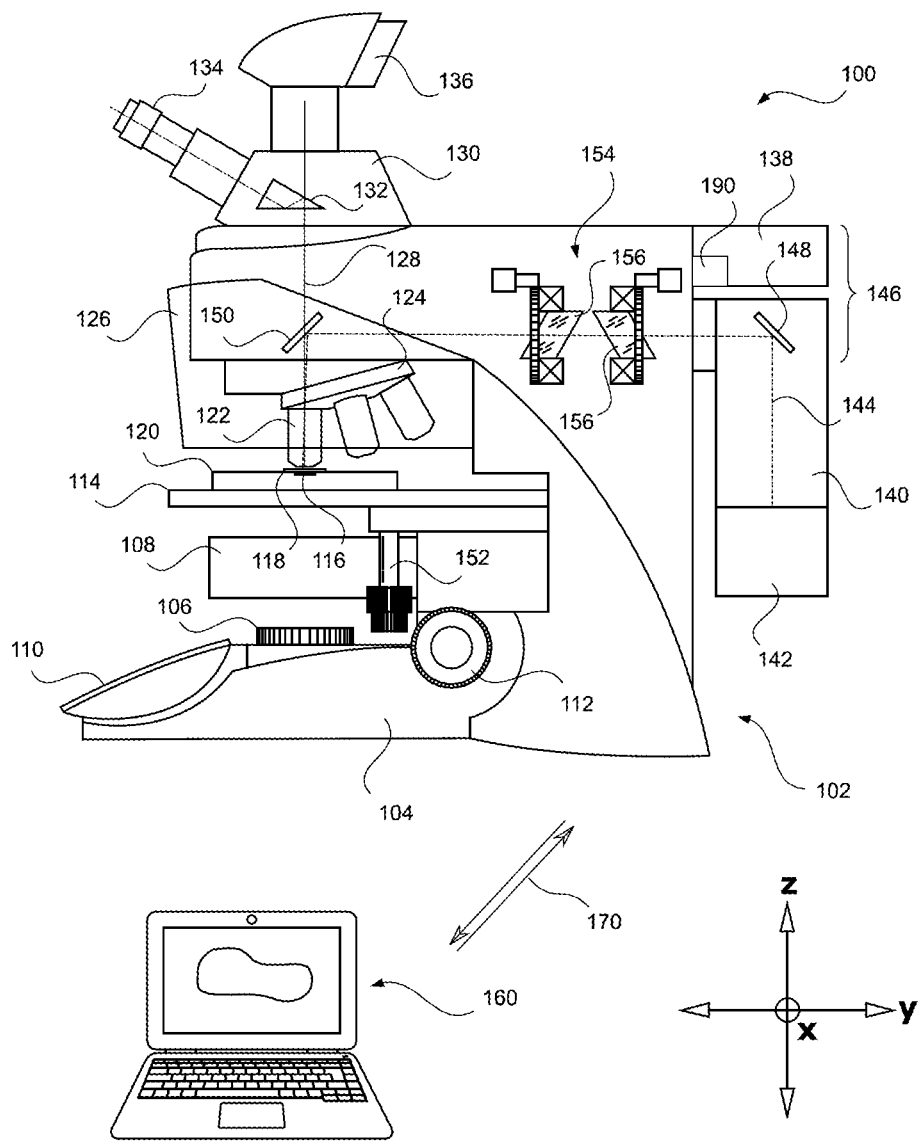
FIG. 1 shows an exemplary laser microdissection system that can be used to carry out embodiments.

The terms "sample," "object," "examination object," and the like are used synonymously below and may refer to any type of the stained, or marked, or unstained, or unmarked, samples discussed above. In particular, corresponding examination objects for use in laser microdissection are basically fixed or immobilized on a specimen slide in a known manner and, where appropriate, covered by means of a membrane.

The general term "laser microdissection" is used for a plurality of different process variants commonly referred to in professional circles by English technical terms and sometimes not consistently. Corresponding method variants are frequently described in the technical literature and are summarized only briefly below. The present invention can basically be used in connection with all method variants.

In all cases, the laser beam used for processing is positioned in laser microdissection by a relative movement between the laser beam and the examination object. In certain embodiments, this relative movement can be achieved by a horizontal movement of the sample stage. In a particularly advantageous embodiment, which is, for example, described for the first time in DE 100 18 253 C2, the microscope stage is however arranged to be stationary during the cutting or for the (fine) positioning of the laser beam. In this embodiment, in an incident light device of the microscope used, by means of which device the laser beam is radiated onto the examination object via the microscope objective, a laser scanning device is arranged which in this case consists of two thick transparent wedge plates inclined to the optical axis and rotatable independently of each other about the optical axis.

The wedge plates are preferably driven by means of stepper motors which bring about a relative rotation of the wedge plates in relation to each other. The laser beam is guided through the wedge plates, whereby it is deflected by a deflection angle with respect to the optical axis. By rotating the wedge plates about the optical axis, the deflection angle can be adjusted and varied, wherein the arrangement is however carried out in such a way that the laser beam always passes through the center of the rear objective pupil. This is achieved in particular by a suitable selection of the thickness and the inclination of the wedge plates. A corresponding laser microdissection system is also explained with reference to the attached FIG. 1.

In the embodiment just explained, the laser beam can be directed at any points in the plane of the examination object. To this end, the maximum deflection angle is dimensioned such that the laser beam is deflected only up to the edge of the field of view. This applies at the same time to all objectives irrespective of their magnification. The use of a laser scanning device in the particularly advantageous embodiment just explained makes it possible to dispense with a complex motorized sample stage. Since the sample stage is stationary during the cutting process, the user can observe and control the cutting process in the specimen.

The different method variants already mentioned above differ in particular in the manner in which regions to be examined are detached from the unity of the examination object and transferred into suitable collecting containers or onto suitable carriers.

In one method variant, the laser beam, in particular in the form of a cutting line, is guided around the region to be examined and thereby the region is separated out. In this case, the examination object is arranged in particular on the underside of a coated or membrane-covered specimen slide. Through the action of the laser beam, the examination object or a diaphragm connected thereto is severed, and the region separated out in this way can fall by the effect of gravity into a collecting container arranged below the examination object. For processing, a cutting line can also, for example, be closed by means of a finely focused laser beam apart from one or more remaining webs. By means of a subsequent refocusing, the laser beam can be widened and directed onto the remaining web(s). In this way it is possible, for example, to prevent twisting and a stress-induced deflection during falling-out.

In so-called laser-pressure catapulting (LPC), on the other hand, the cut-out sample is catapulted, in particular by selectively directing a suitable laser pulse onto a previously explained residual web of a cutting line or onto a cell that is to be separated. Different physical phenomena are held responsible for the catapult effect. The correspondingly catapulted cells can be collected, for example, in a sample vessel or be attached to a membrane provided with an adhesive layer.

In so-called laser capture microdissection (LCM), cells, while still on the carrier, are attached to a membrane by the action of the laser beam. By raising or pulling off the membrane, the target regions can be torn out of the unity, wherein these target regions remain attached to the membrane. The target regions detached in this way can then be transferred together with the membrane into a collecting container. This method can be combined with a prior dissection in order to prevent tearing out.

In a further variant, living cells in a sterile culture dish or a corresponding specimen slide can, for example, be covered with a light-absorbing membrane. The laser beam can be used to cut around cells of interest underneath the membrane. If the membrane is removed, the cells will remain in the culture dish or on the specimen slide and unwanted cells can be detached together with the membrane. This method variant is also called cell ablation.

In most cases laser light in the ultraviolet wavelength range is used for laser microdissection, wherein the laser beam used is mostly pulsed. A high energy density with simultaneous narrow local limitation of the irradiated laser light is achieved by focusing the laser beam. High pulse frequencies can be used, for example, for fast cutting or attaching and for producing fine cutting lines.

While the cuts and the collection of the dissectates or samples can in this way take place fully automatically if desired, it is nevertheless possible for a cut not to be optimally carried out for various reasons. There is therefore a need to improve the reliability of automatic or semi-automatic laser microdissection.

In order to achieve improved reliability of automatic or semi-automatic laser microdissection, embodiments of the present invention provide a method for checking a dissection process in a laser microdissection system and a system for carrying out the same including a control unit, a computer program, and a laser microdissection system.

In particular, according to an embodiment of the present invention, a method for checking a dissection process in a laser microdissection system is provided, in which a dissection process is first carried out in a first region of an object by means of a laser beam for cutting out a dissectate and then first image data of at least the first region are acquired after the dissection process. Depending on the laser microdissection system used, the dissection process can also not only comprise only the actual cutting process by correspondingly designed laser beams or laser pulses but also optionally include further steps for the active or passive transportation of the cut dissectate out of the object, for example. The dissection process may thus also comprise steps, such as setting one or more laser pulses with which transportation of the cut-out dissectate into a collecting container is brought about. Raising a membrane together with the cut-out dissectate in order to lift the dissectate out of the object may also be part of the dissection process. In this respect, the term "dissection process" is to initially describe the corresponding steps irrespective of their success.

A first focal plane which is at a parallel offset along the optical axis to the plane of the object can, in particular, be selected for acquiring the first image data. Alternatively or additionally, the first image data can also be recorded with a focal plane that corresponds to the plane of the object.

These image data are then analyzed in order to recognize whether the dissection process was successful, i.e., whether the dissectate was in particular completely cut out of the object and detached. In particular, an examination can be carried out here as to whether the image data have sharp contours within the first region in order to determine whether the dissection process was successful. This examination can, in particular, take place completely automatically by suitable image processing, i.e., on the basis of corresponding software modules which are capable of analyzing acquired image data in this way.

If sharp structures are present in an offset focal plane, it can be concluded that at least a portion of the dissectate projects into this focal plane and that the dissectate is therefore still attached to the object. If sharp structures are found in the original object plane, it can be concluded that the dissection process was unsuccessful and that the dissectate is at least partially still in the plane of the object at its original location.

As a result, it is possible to take steps automatically, where applicable, to end the dissection process successfully, such as re-cutting and/or further processes which also bring about the detachment of an already cut dissectate, e.g., the setting of one or more laser pulses for transporting the cut dissectate.

By defocusing into a focal plane offset along the optical axis, portions of a dissectate that project out of the plane of the object can be recognized. In this way, protruding dissectates formed by an incomplete laser cut can, for example, be detected.

In further embodiments, second image data can here be acquired after the dissection process with a second offset focal plane, which is at a parallel offset along the optical axis and on the opposite side of the object with respect to the first focal plane, and the second image data can be analyzed in order to recognize whether the dissectate was completely cut out of the object during the dissection process. This ensures that dissectates projecting from the plane of the object are recognized on both sides of the sample.

In one variant, it is possible for a plurality of further offset focal planes to be defined which are at parallel offsets along the optical axis to the plane of the object, and for image data to be acquired in each of the plurality of offset focal planes. These recorded image data are then analyzed in order to determine whether the cutting out and/or separating of the dissectate during the dissection process was successful. The use of a plurality of offset focal planes at different distances from the object ensures with a suitable selection of the planes that a possibly folded or protruding dissectate is visible in one of the focal planes.

In this case, the offset focal planes can, for example, be approached successively by a stepwise changing of the focus of an optical system which generates the image data. In this way, a broad focal region is as it were traversed stepwise or continuously and the image data are analyzed in the process.

Preferably, an end distance from the plane of the object can be defined, wherein the plurality of further offset focal planes is between the plane of the object and the end distance. This end distance thus defines the focal region in at least one of the directions; it is also possible to define end distances on both sides of the object in order to widen the focal region on both sides. In this case, the end distance can be freely selected, wherein, in one possible embodiment, the end distance is at most half of the greatest extent of the dissectate in the plane of the object. With this selection, any folded dissectate that projects into the region of the cut hole is likely to be recognized.

In addition to the aforementioned possibilities, image data acquired after the dissection process can be compared to reference image data in order to determine whether separating the dissectate was successful. This makes it possible to recognize whether the region to be cut out is shown "empty" in the image or whether a change in comparison to the image data before the cut can be recognized at all.

The reference image data may be generated in various ways depending on the embodiment. For example, reference image data can be acquired by acquiring initial image data of the first region before the dissection process, i.e., for example, by means of an image of the region that has not yet been cut. In this case, these reference image data can optionally also be acquired with the first and/or the second offset focal plane, i.e., with a focus outside the object plane but also with a focus directly into the object plane. Furthermore, reference image data can be generated by acquiring image data of a background area without an object. Another possibility is to generate reference image data by defining threshold values for parameters of the image data, the parameters comprising at least one of the following for at least one subset of the image data: brightness, contrast, frequency distribution, gray-value distribution, color values. Furthermore, reference image data can be acquired in various contrast methods (e.g., bright-field, phase, DIC, IMC, fluorescence). Theoretical reference image data which can reproduce typical properties of an empty background or an acquired cut hole can thus be obtained. Moreover, reference image data may be generated by acquiring image data of the object outside the first region. All these possibilities may also be combined with one another as desired.

Furthermore, in one embodiment, reference image data can be acquired before the dissection process in a second region of the object including the first region, then third image data of the second region can be acquired after the dissection process, and the acquired third image data can finally be compared to reference image data of the second region in order to determine whether the cut-out dissectate is on the object. Overview images of a larger image section can thus be used in order to, for example, find dissectates which were cut out correctly but did not then land in the collecting container provided.

In all variants, it is possible to repeat the dissection process at least partially if it was previously determined that the dissection process was not successful. This can also comprise, for example, a partial recut only in individual regions, a complete recut along the entire cutting line, one or more individually set laser pulses for severing and/or for transporting the dissectate, or other sub-steps of the dissection process.

An embodiment of the invention moreover relates to a control unit for a laser microdissection system, which is configured to carry out individual, several, or all method steps as described above. An embodiment of the invention also relates to a computer program with program code for carrying out a method, which can, for example, cause a processor or a suitable control unit to carry out such method steps. The implementation as program code enables a simple expansion of existing and new systems.

Lastly, an embodiment of the invention relates to a laser microdissection system comprising a laser configured to carry out a dissection process, and at least one camera configured to acquire image data of the object, and a control unit capable of carrying out the described method steps.

Further advantages and embodiments of the various embodiments are given by the description and the accompanying drawings.

It goes without saying that the features mentioned above and the features to be explained in detail below can be used not only in the respective indicated combination but also in other combinations or alone.

The term "and/or" may be abbreviated as "/" and includes all combinations of one or more of the associated listed items.

Exemplary embodiments are described below in greater detail with reference to the drawing.

In FIG. 1, a laser microdissection system according to an embodiment of the present invention, or a laser microdissection system that can be used to carry out a method according to an embodiment of the present invention, is schematically illustrated and denoted as a whole by 100. The laser microdissection system 100 substantially corresponds to that disclosed in EP 1 276 586 B1, to which express reference is made here.

A Cartesian coordinate system, by means of which subsequently mentioned axes or directions x, y, and z are illustrated, is shown in FIG. 1 at the bottom right. In this coordinate system, the x-axis is perpendicular to the plane of the paper, and the y-axis and z-axis are in the plane of the paper. The x-axis, the y-axis, and the z-axis are respectively perpendicular or orthogonal to one another. In this example, the z-axis thus corresponds to the optical axis in the region of the sample.

The laser microdissection system 100 comprises a microscope 102. In a microscope foot 104 of the microscope 102, an illumination unit 106 which is only partially illustrated here, is be provided in the illustrated example. The illumination unit 106 may comprise, for example, a light source for providing illumination light and also means for influencing the illumination light, e.g., filters and/or diaphragms. For transmitted-light illumination and for adjusting suitable contrast methods or observation methods, a condenser unit 108 illustrated in a highly simplified manner is provided in the example shown.

An operator interface 110 can, for example, also be arranged on the microscope foot 104, and can be designed, for example, as a touchscreen; a user can input and/or read out viewing and/or processing parameters via said operator interface, for example. The microscope 102 has an adjustment knob 112. This adjustment knob serves for operating a coarse drive and a fine drive for adjusting a height of a microscope stage 114.

An object 116 which is located on a specimen slide 118 which in turn is accommodated in a holder 120, e.g., a section applied to the specimen slide, can thereby be brought into an object plane of an objective 122. The objective 122 is mounted in an objective turret 124 in addition to further objectives which are not indicated separately. For protection from laser radiation, a protective cover 126 which is in particular transparent may be provided.

From the object 116 emitted observation light traverses along an observation beam path 128. In a lens tube unit 130 having suitable coupling-out devices 132, a preferably variable portion of the observation light can be coupled out, e.g., by 60°, and presented to a user by means of an eyepiece pair 134. Another portion of the observation light can be coupled into a digital image acquisition unit 136, such as a camera, and imaged. An image analysis unit 138 may be associated with the image acquisition unit 136 on site, in a control unit 136 or a control computer (see below) or in another spatial arrangement.

The laser microdissection system 100 has a laser unit 140 having a laser light source 142. A laser beam 144 provided by the laser light source 142, which may, for example, be a UV laser light source, is deflected at a first deflection mirror 148 and a second deflection mirror 150 in an incident light unit, which is indicated here as a whole by 146, and focused onto the object 116 by the objective 122.

In the laser microdissection system 100 illustrated here, the location at which the laser beam 144 impinges on the object 116 can basically be adjusted in various ways. On the one hand, a manual adjustment device 152 can be provided, by means of which the microscope stage 114 designed as a mechanical stage can be adjusted in the x- and y-directions (i.e., in this case, perpendicularly or in parallel to the plane of the paper). In addition to the adjustment device 152, electromechanical actuating means can also be provided, which can be controlled, for example, by the control unit 138 or the position of which can be detected by the control unit 138.

The control unit 138 may also control any other motorized functions of the laser microdissection system 100 and, in particular, provide an interface to an external control computer 160, which can be connected via corresponding wireless or wired connections.

In particular, a laser deflection device 154 can be provided for laser microdissection. By means of the laser deflection device 154, the laser beam 144 can be deflected in relation to an optical axis extending between the first deflection mirror 148 and the second deflection mirror 150. The laser beam can therefore impinge at different positions onto the second deflection mirror 150, which can be designed, for example, as a dichromatic splitter. In this case, the arrangement is in particular such that the laser beam 144 passes through the rear objective pupil. By a corresponding deflection, the laser beam 144 is focused onto the object 116 at different positions. Deflection by means of a laser deflection device 154 of the type shown here is shown in detail, for example, in EP 1 276 586 B1. It should be emphasized that different possibilities for deflecting a laser beam b or for positioning the object 116 in relation to the laser beam 144 can be used here. The invention is not limited to the example shown.

In the illustrated example, the laser deflection device 154 has two solid, glass wedge plates 156, which are inclined to and independently rotatable about the optical axis. For this purpose, the wedge plates 156 are mounted with ball bearings which are not indicated separately. Each of the wedge plates is connected to a toothed wheel which is likewise not indicated separately. The toothed wheel can in each case be rotated by means of an actuator which can be acted upon by a corresponding control signal. The actuators may have position sensors and a position detected by them may be transmitted to the control unit 138.

The microscopic image acquired via the observation beam path 128 and the laser beam 144 are focused on the one hand by raising or lowering the microscope stage 114, wherein the focal positions of the microscope objective 122 and of the laser beam 144 are matched. For example, an image analysis of the microscopic image acquired via the observation beam path 128 can be carried out in the control unit and/or in the control computer 152. By motorized driving of the microscope stage 114, an autofocus system is thereby implemented, which is again illustrated separately by 190.

Instead of the system shown here, laser microdissection systems of different construction can also be used, in which, for example, different optical paths are used for observation and image acquisition and for the laser beam used for cutting. In another variant, for example, the upright microscope shown here could be replaced by an inverse microscope in which the objective and the optical elements downstream thereof are located below the specimen.

In this case, there is the possibility that a dissectate is not or is not completely separated from the object along the cutting lines and is still attached to the object at least one edge. Likewise, a completely cut-out dissectate, in particular in a contactless system, might not land in the provided collecting container in which the dissectates are collected for further processing, but, for example, as a result of external influences land on the surface of the sample or of the specimen slide.

In order to ensure now that the desired cuts have been executed correctly and the dissectates obtained have been collected in the associated collecting containers, monitoring of the dissection region by acquiring image data can be carried out according to one embodiment.

In this respect, the region that may be relevant to the observation or image acquisition, i.e., the region in which the cut will take place, can be defined in one possible embodiment. For this purpose, a predetermined coordinate range could be defined, or, after the definition of the cutting lines, the corresponding region within the cutting lines could, for example, be defined as the relevant observation region by a user or by the controller of the dissection system. In principle, it is also possible to define as observation region a first region that is larger than the desired dissectate in such a way, for example, that a round or rectangular observation region is defined that reliably includes the dissection region or optionally also several dissection regions in all directions of extension. In addition, an observation region could also be defined which takes into account a defined additional edge region going beyond the dissection region, i.e., in such a way that a widened edge is produced along the contours of the dissectate with an arbitrarily selected edge width and forms the observation region.

The definition of the image region can also be dependent on the preset image section that a camera used for image acquisition and the optical system used can image. Insofar as a dissection region to be checked cannot be imaged completely in an image section with the required or desired resolution due to its size or shape, the described image examinations can take place over several image sections which are offset in the x-y plane and which are then analyzed individually or jointly.

Image data of this observation region can then be acquired or recorded in this defined observation region at least after a laser dissection process has taken place, in which a defined region of the object was to be cut out and detached by means of a laser beam.

According to one embodiment, an examination can now be carried out by means of such image data as to whether a cut was carried out completely and the dissectate actually separated, because it is conceivable that although a dissectate has been largely cut out, the cut was not carried out completely in one or more sub-regions of the cut-out circumferential line so that the dissectate continues to adhere to the object by an edge region. For example, sample-specific properties, inappropriate cutting parameters, or errors in the cutting process may be responsible for this.

Figure 2:
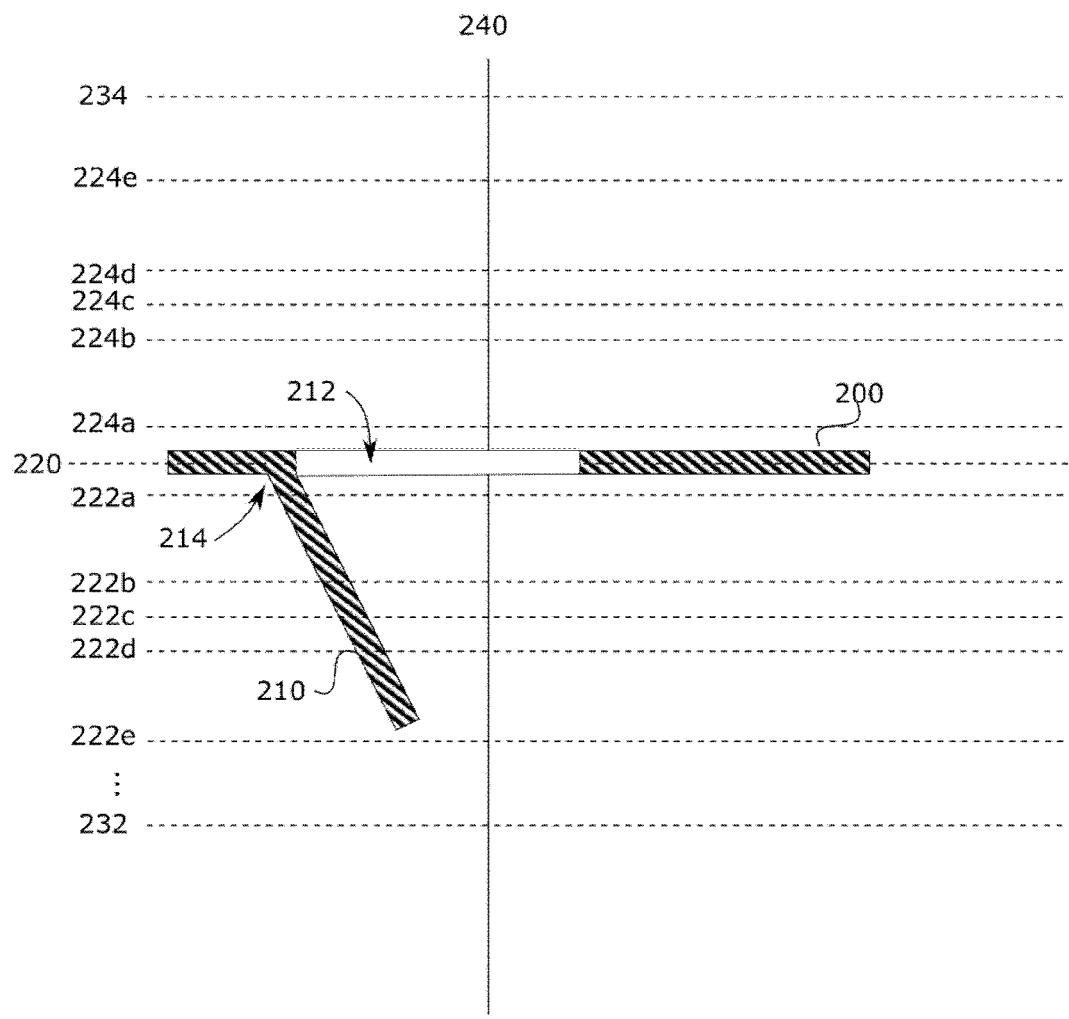
FIG. 2 shows a schematic side view of an incompletely cut dissectate with various focal planes for image acquisition.

FIG. 2 shows a side view of a dissected sample 200 in which a dissectate 210 has not been completely cut out and removed but remains connected at an edge region 214 to the remaining sample 200 and folds downward by gravity. The cut hole 212 may appear empty or partially so depending on the angle at which the partially cut dissectate folds. In this case, the proportions and distances are only to be regarded as a schematic representation for clarification of the method steps and do not correspond to the actual conditions.

In order to recognize dissectates 210 with such incompletely cut-off edge regions 214, image data can therefore be acquired in at least one focal plane other than the object plane and analyzed. If a dissectate 210 protrudes upward or downward in one direction and thus projects out of the object plane 220, an image acquired with a focal plane displaced at a distance from the object plane 200 along the optical axis 240 will have sharp structures at least in one of these regions. On the other hand, if a dissectate is completely cut out, an image recorded with a focal plane 222, 224 outside the object plane 220 will not have any sharp structures. The dashed lines in FIG. 2 show exemplary focal planes in which image data could be acquired. Accordingly, an image in a focal plane that intersects the hanging partial dissectate 210 shows a sharp structure at this intersection line with the focal plane. In the example shown, each of the focal planes 222a, 222b, 222c, 222d would thus show a sharp structure due to the hanging dissectate 210. In contrast, all of the focal planes 224, 234 that are on the opposite side of the dissectate relative to the optical axis would not have any sharp structures in this example. Likewise, focal planes further away from the object plane 220 than the extent of the folded dissectate, for example, the focal planes 222e and 232 in FIG. 2, do not show any sharp structures.

Methods with which image regions can be examined for sharpness by suitable automatic image processing are basically known and can be used for examining the image data. For example, the acquired image data can also be further processed or converted for this purpose in order to enable an analysis of the data in the frequency domain, for example.

The position of the expected cut edges, i.e., the coordinates along which the cut was carried out in the object 210, is preferably known in the system. The found information, i.e., for example, the position of the blurred regions in the x-y plane and/or their distance from the sample in the z-direction, can then be used together with the known cutting coordinates in order to recognize at which location the dissectate is attached and has not been cut correctly. For this purpose, either the specific edge piece can be localized, or predefined sections of the dissectate or of the cutting line, such as a division into four quadrants, can be used to determine in which of the predefined sections the cut was incomplete. This information can then be used both for further image examinations and for a subsequent recut of the desired dissectate. The data can also be stored and processed for further purposes. The search for sharp structures can also be limited to the region of the cutting line or to a defined edge region around the cutting line, wherein the edge region can be defined from the cutting line not only inwardly into the region of the cut hole but also outwardly. In this way, computing power can be saved during the image processing in order to enable rapid automatic dissection.

Since an attached dissectate can project from a sample both upwardly and downwardly, at least two images with at least a first and a second focal plane can also be recorded depending on the embodiment, wherein at least one focal plane with which one of the images is acquired is selected on each side of the sample along the optical axis. Preferably, only the focal plane is changed in this case, while the other parameters, such as image section and brightness settings are kept the same. A preferred sample side could also be selected for the first focal plane. If, for example, a system is used in which the cut-out regions fall into a collecting container in a contactless manner by gravity, even an only partially cut dissectate is expected to fold downwardly in the greater number of the cases. In this case, a plane which is downwardly offset by a predefined distance from the object plane along the optical axis can thus be selected as the first focal plane. The image acquired in this first focal plane can then first be analyzed and only in the event that the result does not produce any sharp structures at this point can a second or further image be recorded in which the focal plane is on the opposite side of the sample, i.e., is upwardly offset by a predefined distance along the optical axis from the object plane. Alternatively, however, both images in the first and the second focal plane can also be recorded first and subsequently analyzed. It is also conceivable to record both images but to terminate the analysis as soon as a sharp structure is been found which indicates that at least a portion of the dissectate is projecting out of the sample plane and has thus not been separated over the entire cutting line.

The distance of the first and/or the second focal plane from the object plane 220 (along the z-axis) can be selected in various ways. For example, half the minimum diameter of the expected dissectate or a distance which maximally corresponds to the minimum diameter of the dissectate can be set as the distance between the object plane and one or both offset focal planes. With these values, it can be assumed that a dissectate that is attached at an edge region perpendicularly or almost perpendicularly and is otherwise almost completely cut out will be reliably detected outside the object plane by the sharpness check. Likewise selected could be a focal distance 222a, 224a that is only slightly offset from the object plane so that each folded object is likely to be recognized.

The dimensions of the dissectate can be obtained, for example, from the manually or automatically created cutting line coordinates in the system, or also from an image which is recorded before the cut and which is used to recognize or select relevant regions in the sample to be cut out later.

Figure 3:
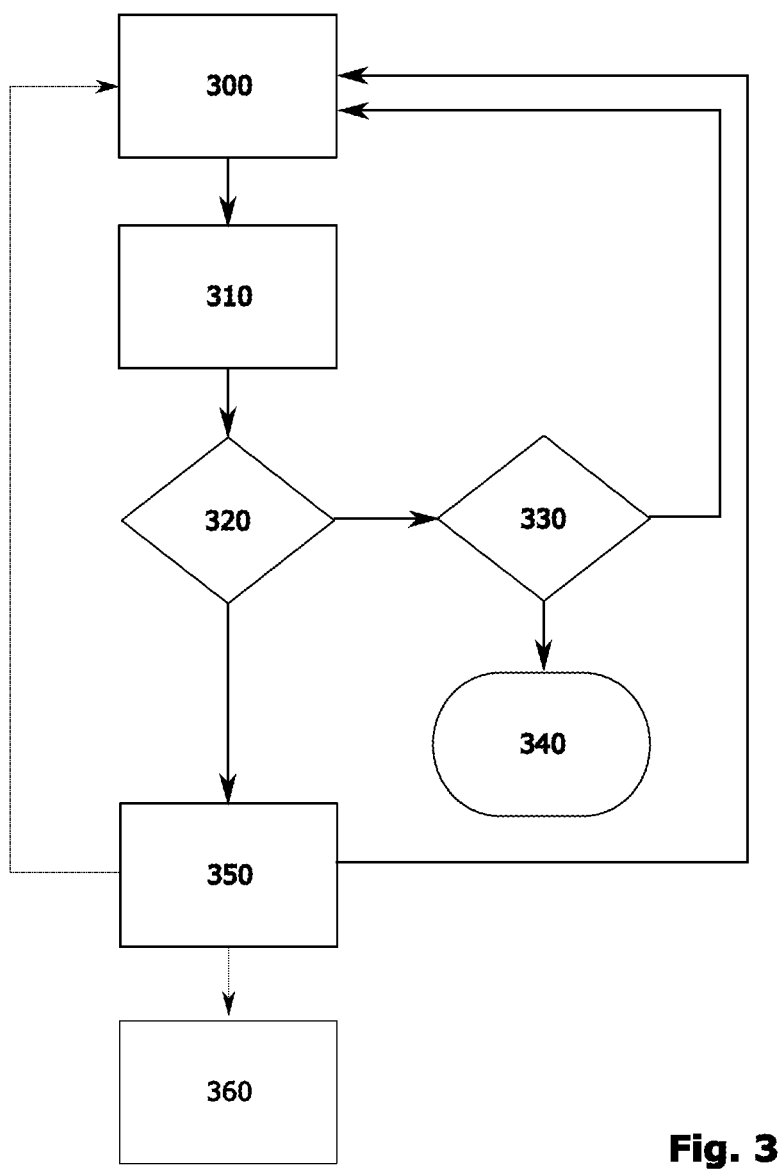
FIG. 3 shows a schematic sequence of a method according to an exemplary embodiment.

In further embodiments whose method steps are shown by way of example in FIG. 3, instead of a fixedly selected distance for the first or second focal planes at which only a few individual images are analyzed, a focal region starting at the object plane 220 or at a starting region at a distance therefrom can also be traversed on one side or both sides up to a predetermined end distance from the object plane, wherein images can be recorded and analyzed continuously or at specific intervals. In FIG. 2, the focal region can thus correspond, for example, to the region which is located between the uppermost focal plane 234 and the lowermost focal plane 232 at the same or a different distance from the object plane 210 in each case.

Defocusing therefore first takes place by means of the optical system in step 300 and here a first focal plane is selected which is offset from the object plane. In this offset focal plane, image data are acquired in step 310, which image data are checked for sharp structures in step 320. If sharp structures have been found, it can be assumed that a portion of the sample is projecting from the object plane and has thus not been completely removed from the sample and collected. Accordingly, this information, e.g., together with relevant coordinates and data relating to the respective dissectate, can be stored or further processed in step 350. For example, these data may be used to repeat the cut or a portion thereof in method step 360. If no sharp structures were found, it can first be checked in step 330 as to whether the desired end point of defocusing has already been reached, i.e., whether all desired focal planes have already been traversed and whether, depending on the embodiment, the end distance or again the object plane has been reached, for example. If all provided focal planes have been traversed and the image data acquired in each case have no sharp structures, the sharpness test for this dissectate can end in step 340. If all the focal planes have not as yet been traversed, defocusing by a further distance step can take place back in step 300, i.e., a further offset focal plane can be selected in which image data are again recorded in accordance with step 310 and examined 320 for sharp structures.

In a further embodiment, a focal plane lying directly in the object plane can also be selected in step 300 before the first offset focal plane, and image data can also be recorded (step 310) with this focus, which image data are examined in step 320 for sharp structures within the region in which the dissectate was to be separated. Since the focus setting is usually still in the object plane after the cutting process, an image can thus be recorded without further adjustment of the optical elements. If the dissectate has not been correctly cut or detached and is still partially or completely in the object plane, sharp structures will be found in this case. Statements about the success of the dissection process can thus already be made in this first step and, optionally, a corresponding postprocessing can be initiated. Depending on the embodiment, the sharpness test can then take place in further planes in any case in order to, for example, find partially folded dissectates, or the process can be terminated if sharp structures are found.

In this case, the end distance 232, 234 up to which the focal region is traversed may respectively correspond to the first or second focal planes described above, for example. However, the selected end distance for continuous traversing and analyzing a focal region can also be significantly smaller or larger than the previously defined distance of a focal plane for a single image. For example, a focal region can be chosen that is defined on both sides of the sample up to half the maximum diameter of a dissectate. Since a sample that has remained attached generally still has a marginal contact with a cutting edge in the focal region, a selected end distance of half the maximum diameter in the case of a folded sample should reliably ensure a sharp structure within this traversed focal region. An examination of focal planes still further away from the object is therefore generally not necessary when traversing a focal region. Nevertheless, the focal regions can of course be selected arbitrarily; for simplification, for example, the same traversed focal region can be selected for all dissectates.

FIG. 2 shows, by way of example, an end distance 232, 234 which extends beyond the extent of the dissectate in the sectional plane shown; however, this illustration is to be understood only schematically and not as a restriction. For example, the extent of the dissectate in a direction that is perpendicular or oblique to the image plane could still extend significantly beyond the length shown of the folded dissectate. The end distance may can also be freely selected.

In this way, it can also be ensured that even an attached dissectate that is almost completely folded over and thus projects out of the object plane only with a curved edge region, for example, and thus only shows sharp structures in a focal plane relatively close to the object plane is also detected by the sharpness test.

Such an embodiment is suitable in particular with sufficient computing power of the image processing system. The number of recorded images or the rate at which image data are recorded when traversing the focal region can be fixedly predefined or can be variably defined. For example, defocusing can be provided at a constant speed, during which image data are acquired at fixed time intervals. The data can be recorded immediately after acquisition and thus in parallel to further defocusing so that the result of the image analysis from a previous focal plane does not necessarily have to be awaited. In this way, a plurality of images in various focal planes are thus obtained. The acquisition rate can also be selected as a function of the size of the dissectate and thus of the selected end distance of the focal region.

It goes without saying that the order of traversing the focal region can likewise be selected arbitrarily. For example, it has already been described that defocusing and the acquisition of image data in the offset focal planes can start at the object plane and be carried out up to a selected end distance from the object plane. The corresponding sequence can subsequently be repeated on the other side of the sample. However, it is also possible to start the analysis and image acquisition in the focal plane that was selected as the maximum end distance, i.e., for example, with a focal plane 234 above the object plane 210 and to traverse the focal region stepwise or continuously from there up to the selected end distance on the opposite side of the sample 200, i.e., up to the focal plane 232 below the sample. In doing so, image data can be recorded in all desired planes. Again, the side of the sample on which the larger number of folded dissectates is expected can preferably be selected as the starting point.

In this embodiment, the analysis or also the recording of images can be stopped as soon as a sharp region outside the object plane has been found in step 320. Alternatively, further images can also be recorded or analyzed thereafter, from which images, for example, even three-dimensional information about the attached dissectate can then be obtained, e.g., about the angle at which an attached dissectate projects from the plane. The further images and sharpness tests in these image data can also be used to verify the first results in order to thus ensure that it is actually a sharp region.

It goes without saying that the number of acquired image data can be selected arbitrarily in different focal planes so that each embodiment can be used between individual images at a fixed distance from the object plane up to quasi-continuous image acquisition at very small distances. The focal region can also be traversed continuously or stepwise for each image.

In addition, in one possible embodiment, before checking the cutting edges, it can, for example, generally be checked whether the region to be cut out has actually been cut out. If the dissection was successful and the dissectate was completely cut out, the cut-out region is expected to be represented differently in the image than the remaining object. A successful cut can therefore inter alia be checked by comparing the acquired image data, which comprise at least the dissected region, to reference image data.

Figure 4A:
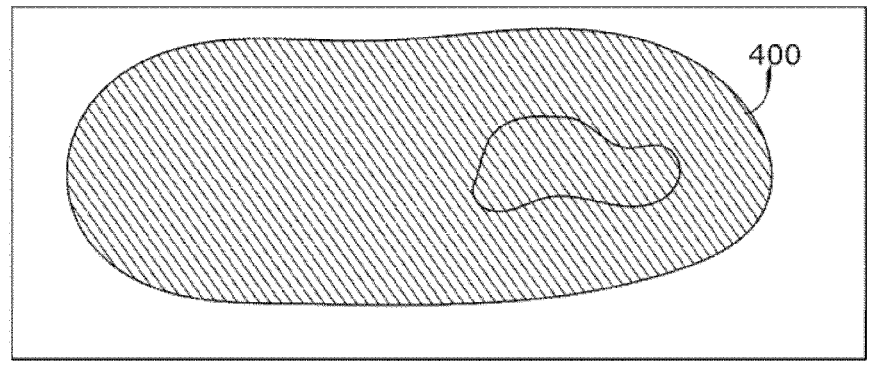
FIGS. 4*a* to 4*c* show, by way of example, acquired image data before and after a cutting of the object.
Figure 4B:
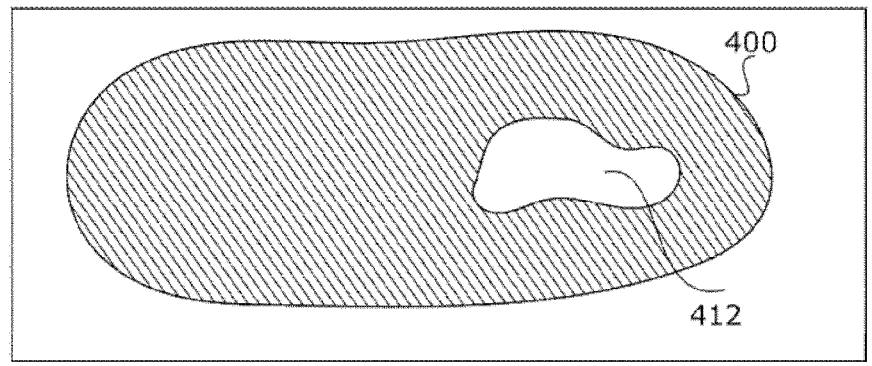
Figure 4C:
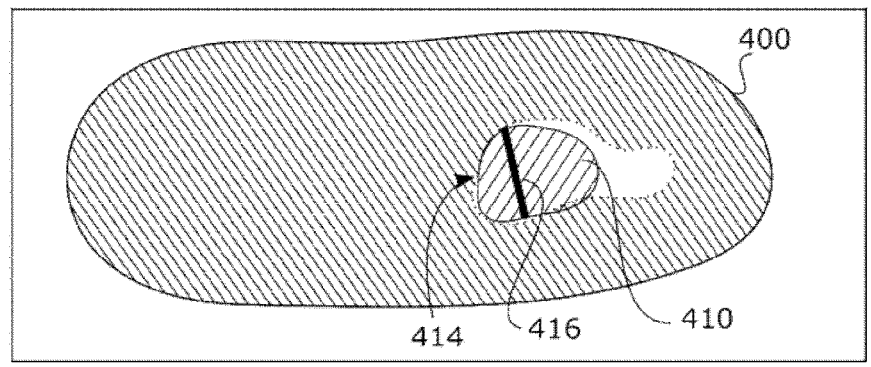

FIG. 4 shows, by way of example, various image data which can be acquired before and after a laser cut. FIG. 4a shows an acquired image of a not yet dissected sample 400 and a contour 402. The contour can, for example, be the contour of an acquired object or a cutting line which is drawn in the image data and along which cutting is to take place in a subsequent step. FIG. 4b shows image data of the sample from FIG. 4a with the same image section, wherein the region to be cut out now appears white and thus empty. It can thus first be assumed that this region has been dissected. FIG. 4c again shows image data of the sample from FIGS. 4a and 4b after a laser cut, wherein it can now be seen that the region appearing white is smaller. Thus, although a region can be recognized as cut-out, the dissectate 410 is still attached to the sample in an edge region 414. The different hatching is intended to illustrate that the dissectate is folded at an angle to the plane of the object 400 and projects obliquely from this plane. In this case, the sharpness test previously described with reference to FIGS. 2 and 3 would have a sharp structure indicated by line 416 in an offset focal plane, e.g., plane 222c of FIG. 2.

Figure 5:
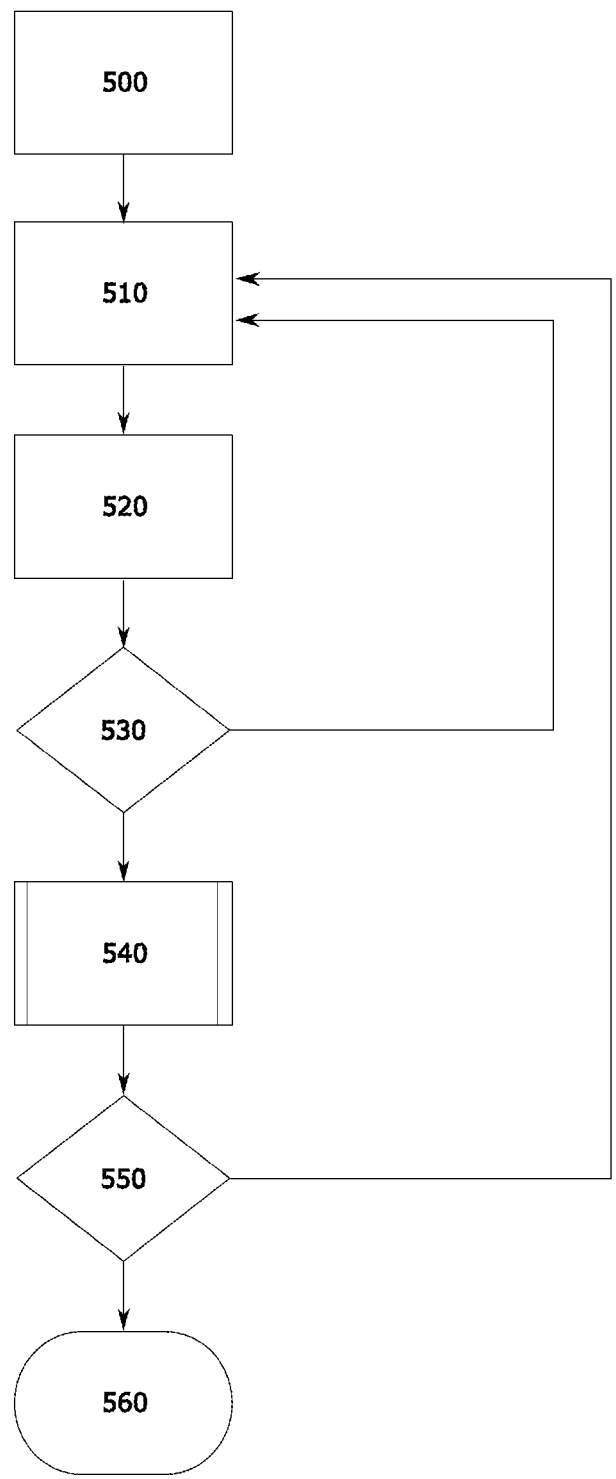
FIG. 5 shows a schematic method sequence of an expanded embodiment.

FIG. 5 shows an exemplary method sequence in which an examination is first carried out as to whether the dissection region appears empty. For this purpose, reference image data may be recorded or generated in step 500 before a cut, said reference image data being described in greater detail below. In step 510, the laser cut is subsequently carried out along the predetermined cutting line. In step 520, image data are then acquired after the cut has taken place. In step 530, these image data can be compared to the reference image data from step 500. If the comparison of the image data reveals that the region to be cut out appears empty, the examination for sharp structures, which was described extensively in connection with FIG. 3 and the method shown there, can be carried out in offset focal planes in step 540. If this examination also shows in step 550 that no sharp structures have been found, the image examination for this dissectate will be ended in step 560 and the next sample region can be approached. On the other hand, if, in step 530, the region to be cut out is recognized as not empty, the laser cut 510 may be repeated. Preferably, even after a repeated cut, the image recordings and analyses are repeated in order to check the success.

In one possible embodiment, for the examination 530 as to whether a region to be cut out is empty as in FIGS. 4b and 4c, the same image data can be used that are also used for the subsequent sharpness test, i.e., image data that were recorded in a focal plane which is offset by a certain distance from the object plane along the optical axis. As has already been described, the distance between the offset focal planes and the object plane substantially corresponds to the dimension of the dissectate, i.e., it can, for example, lie in the range of µm. Since the cut-out region should be empty in the event of a successful cut and thus any still visible features (e.g., microscope background, collecting container) are far outside the object plane at a distance that usually exceeds the distance of the offset focal plane by several orders of magnitude, the selection of the focal plane for image comparison will play a lesser role on the basis of parameters, such as brightness or contrast.

In other embodiments, reference image data and image data for checking whether the cut-out region is empty may alternatively or additionally be recorded with a focal plane in the object plane. This variant is particularly suitable if the objective for image acquisition and observation is the same as the objective with which the laser beam is focused for the cut. In this case, directly after a cut, the focal plane is already fixed in the object plane without further adjustment.

Various variants can be used in this case in order to carry out a first assessment of the cut that has taken place. For example, background image data that correspond to the background in front of which the object and the observation region are recorded could be used as reference image data. Given appropriate illumination of the observation region in a microscope, it can be expected, for example, that the background and thus also the completely cut-out region of an object in an image will appear essentially bright or white, while the other regions, which represent an object surface, will be darker. The cut-out region may also be rather uniform in its structure, while the object surface typically shows more or less heterogeneous structures. Image data of the background that were actually recorded of this background before the cuts by recording image data of the region without an inserted object and without a specimen slide, wherein preferably the same illumination conditions can prevail as when acquiring the image data after the cut, can then be used as reference image data, for example. Such a reference image can provide reference image data for several objects and cuts.

It is also possible to acquire image data in the observation region in order to obtain reference image data before the laser cut is carried out, so that image data of an unprocessed sample or of a non-dissected object region before the cut are available as reference image data for comparison. These image data can be acquired, for example, with the same offset focus settings that are also subsequently used for the sharpness test. However, image data with a focal plane in the object plane could also be acquired before the cut so that moving the optical elements again can be avoided.

After the acquisition of the reference image, the cut can then take place and image data can subsequently be acquired again in the same observation region. The image data can in each case be stored in a volatile or non-volatile storage element so that the image data can be matched to the reference image data after the cut.

Such a matching or comparison of at least two acquired images can take place in different ways. Basic methods for comparing image data are known in the art; for example, a pixel-by-pixel matching can take place in which contrast values, color values, brightness values, or other parameters are compared and/or matched to threshold values.

In another embodiment, the reference image data may also be theoretical image data corresponding to the expected image data in a cut-out region. These theoretical image data can be defined, for example, on the basis of the expected contrast or by specifications in the frequency domain. For example, a region could be recognized as cut-out if a region having a great brightness, a low contrast, a predetermined uniform structure, or a certain frequency distribution was identified within the object surface. One or more of these criteria can be used to determine theoretical reference image data, or all of these criteria can also be used in combination. The parameters used for defining theoretical reference image data can also be dependent on what type of image acquisition device and which optical imaging system is used, i.e., for example, whether the image data are in gray values or colored, in what manner the sample is illuminated, etc.

In further variants, in addition to a pure comparison with reference image data, the information about the position and size of the object that is to be cut out, for example from the coordinates of the cutting lines, can also be included in the examination. In this way, it can be determined whether, for example, only half of a cut was carried out correctly so that a portion of the dissectate might be folded down and this region appears empty in the checking of the image data. In this case, the region recognized as empty would be significantly smaller than the region defined by the cutting line. The cut can then be classified as completely successful if the region recognized as empty corresponds to the region defined by the cutting line, and can be classified as partially successful if only a smaller region is recognized as empty.

If it is determined in this initial examination step that the region to be cut out is not empty and a correct cut therefore has not taken place, the cut can be directly classified as defective and can automatically be carried out again immediately or at a later point in time along the already defined cutting line. Optionally, a recut is not carried out automatically, but it is only stored in the system or output to a user that the cut was not carried out correctly. If the region to be cut out has not been classified as empty or cut-out, the following examination step with defocusing and sharpness test can be omitted.

If, however, this first check of the cutting region shows that the region appears empty and in fact at least a portion of the object has been cut out, the previously described sequence for the defocused check of the cut edges with offset focal planes can then be carried out as a second step in order to recognize dissectates which remained attached but which, however, result in an empty region in the general image comparison.

In further embodiments, these image examinations can also be supplemented by further steps. For example, the described examinations for empty regions and for sharp structures can be supplemented by an image examination of the collecting container. Further cameras or image acquisition elements and sensors can also be provided for this purpose, which are arranged, for example, directly on the collecting container or under a transparent collecting container. The image data for this examination can also be recorded and checked individually after the cut, or they can be matched to reference image data recorded of the same collecting container or a partial region thereof before the cutting process. It is also possible to record an overview image of several sections of a collecting container after several cuts have been carried out.

A special case occurs when a dissectate that is not completely cut is completely folded over onto the surface of the object and is thus still in the object plane within the scope of tolerances. An examination of the edge regions at a fixed focal distance from the object may in this case not result in any sharp structures, and the cut-out region also appears empty in an image examination as described above. For this reason, in one embodiment, an overview image can be recorded in which, in addition to the region to be dissected, at least one edge region around the region to be dissected is also acquired and analyzed. This overview image can then preferably be compared to a previously recorded reference image of the same image section, which reference image having been recorded before the cutting process. If the object is completely folded over onto the sample surface, an empty region in the region of the cutting line will be revealed in the comparison with the reference image, but the edge region around the cutting line will also show deviations in comparison with the reference image. In this case, the criteria for image matching can be different from the criteria for the recognition of an empty region.

If the image section of such an overview image is sufficiently large, it can also be used for recognizing dissectates which were correctly and completely cut out, but which then landed back on the sample surface as a result of various influences instead of being collected in a suitable collecting container. Reference image data of a larger sample region, which comprises the dissection region or even several dissection regions, or of the entire sample can again be recorded before the cut, which reference image data are then compared to corresponding image data acquired after the cut.

In all embodiments, any data generated within the framework of the acquisition and analysis of the image data can be used immediately but can also be stored for later use or transmitted to other units and systems. For example, coordinates of the cutting line along which the laser cut is carried out can be stored and used again in the analysis of the image data in order to obtain, for example, the position of the expected edge region, the dimensions of the expected dissectate, the end points of the cutting line, or other information therefrom.

For a further-going automation, the image data and the analysis results obtained over several dissectates from image analysis methods as described above can also be used for further adaptations. For example, it is possible to analyze and store where incompletely cut dissectates occur for identical or similar samples. This examination could relate, for example, to the portion of the cutting line to which dissectates are frequently attached, or to the section of a larger sample in which cutting problems increasingly occur when several dissectates are obtained from a sample. Furthermore an examination could be carried out as to what proportion of the automatically obtained dissectates was not completely cut out in a first cut.

Depending on the result of these analyses, an adaptation of the cutting parameters can then for example be carried out by the system. For example, in response to the recognition of several cutting lines which in each case are firmly attached in a similar region of the beginning of a circumferential cutting line and are not completely cut through, a changed laser focus or a changed laser power for further cuts could thus be selected for this cutting line section. Alternatively, a notification indicating that adaptation of parameter values for the cuts seems necessary can be output to a user. In this case, a limit value for the proportion of defective cuts could also be defined so that these adaptations are only carried out if the proportion of incomplete cutting lines rises above a certain percentage of the cuts carried out.

In general, it is also possible to supplement or even replace the automatic and computer-aided image analysis with a manual analysis. For example, limit cases can be defined in which, after the automatic image analysis by appropriate software, a user is prompted via a suitable interface to visually check the image features found. For example, if an automatic examination of an acquired image for sharp regions yields a result within a predetermined tolerance range around a fixed limit value so that it cannot be ascertained with full certainty whether the respective region can be characterized as "sharp," a verification by the user can be requested. In this case, the entire acquired image region or even only the unclear areas could then be displayed to the user at a suitable user interface, e.g., a display screen or touchscreen, and a selection could be offered as to how to proceed with these areas. The user can then choose, for example, whether a recut along the predefined cutting lines is wanted or no further processing is required.

Some exemplary embodiments relate to a microscope comprising a system as described in connection with one or more of FIGS. 1 to 5. Alternatively, a microscope may be part of or connected to a system as described in connection with one or more of FIGS. 1 to 5. Referring again to FIG. 1, system 100 comprises a microscope 102 and a computer system 160. The microscope 102 is designed to record images and is connected to the computer system 160. The computer system 160 is designed to carry out at least a part of a method described herein. The computer system 160 may be designed to carry out a machine learning algorithm. The computer system 160 and the microscope 102 may be separate units but may also be integrated together in a common housing. The computer system 160 could be part of a central processing system of the microscope 102 and/or the computer system 160 could be part of a sub-component of the microscope 102, such as a sensor, an actuator, a camera, or an illumination unit, etc. of the microscope 102.

The computer system 160 may be a local computer device (e.g., personal computer, laptop, tablet computer, or mobile phone) having one or more processors and one or more storage devices, or may be a distributed computer system (e.g., a cloud computing system having one or more processors or one or more storage devices distributed at various locations, e.g., at a local client and/or one or more remote server farms and/or data centers). The computer system 160 may comprise any circuit or combination of circuits. In one exemplary embodiment, the computer system 160 may comprise one or more processors that may be of any type. According to local usage, the term "processor" can refer to any type of computing circuit, such as, but not limited to, a microprocessor, a microcontroller, a microprocessor with a complex instruction set (CISC), a microprocessor with a reduced instruction set (RISC), a very long instruction word (VLIW) microprocessor, a graphics processor, a digital signal processor (DSP), a multi-core processor, a field-programmable gate array (FPGA), e.g., of a microscope or microscope component (e.g., camera), or any other type of processor or processing circuit. Other types of circuits that may be comprised in the computer system 160 may be a custom-made circuit, an application-specific integrated circuit (ASIC), or the like, such as one or more circuits (e.g., a communication circuit) for use in wireless devices, such as mobile phones, tablet computers, laptop computers, two-way radios, and similar electronic systems. The computer system 160 may comprise one or more storage devices, which may comprise one or more storage elements suitable for the respective application, such as a main memory in the form of a read-only memory (RAM), one or more hard disks, and/or one or more drives that handle removable media, such as CDs, flash memory cards, DVDs, and the like. The computer system 160 may also comprise a display device, one or more speakers, and a keyboard and/or controller, which may comprise a mouse, trackball, touchscreen, voice recognition device, or any other device that allows a system user to input information into and receive information from the computer system 160.

Some or all of the method steps may be carried out by (or using) a hardware device, such as a processor, microprocessor, programmable computer, or electronic circuit. In some exemplary embodiments, one or more of the most important method steps can be carried out by such a device.

Depending on certain implementation requirements, exemplary embodiments of the invention may be implemented in hardware or software. The implementation may be carried out with a non-volatile storage medium, such as a digital storage medium, such as a floppy disk, a DVD, a Blu-ray, a CD, a ROM, a PROM and EPROM, an EEPROM, or a FLASH memory, on which electronically readable control signals are stored that interact (or can interact) with a programmable computer system such that the respective method is carried out. The digital storage medium may therefore be computer-readable.

Some exemplary embodiments according to the invention comprise a data carrier having electronically readable control signals that can interact with a programmable computer system so that one of the methods described herein is carried out.

In general, exemplary embodiments of the present invention can be implemented as a computer program product having a program code, wherein the program code is operable for carrying out one of the methods when the computer program product is running on a computer. The program code can be stored on a machine-readable carrier, for example.

Further exemplary embodiments comprise the computer program for carrying out one of the methods described herein, which computer program is stored on a machine-readable carrier.

In other words, an exemplary embodiment of the present invention is therefore a computer program having a program code for carrying out one of the methods described herein when the computer program is running on a computer.

Another exemplary embodiment of the present invention is therefore a storage medium (or a data carrier or a computer-readable medium) comprising a computer program stored thereon for carrying out one of the methods described herein when executed by a processor. The data carrier, the digital storage medium, or the recorded medium are generally tangible and/or not transition-free. Another exemplary embodiment of the present invention is a device as described herein, which comprises a processor and the storage medium.

Another exemplary embodiment of the invention is therefore a data stream or a signal sequence which represents the computer program for carrying out one of the methods described herein. The data stream or the signal sequence can be configured, for example, in such a way that they are transmitted via a data communication connection, e.g., via the internet.

Another exemplary embodiment comprises a processing means, e.g., a computer or programmable logic device, configured or adapted to carry out one of the methods described herein. Another exemplary embodiment comprises a computer on which the computer program for carrying out one of the methods described herein is installed.

Another exemplary embodiment according to the invention comprises a device or system configured to transmit (e.g., electronically or optically) to a receiver a computer program for carrying out one of the methods described herein. The receiver may, for example, be a computer, a mobile device, a storage device, or the like. The device or system can, for example, comprise a file server for transmitting the computer program to the receiver.

In some exemplary embodiments, a programmable logic device (e.g., a field-programmable gate array, FPGA) can be used to carry out some or all of the functionalities of the methods described herein. In some exemplary embodiments, a field-programmable gate array can operate in conjunction with a microprocessor in order to carry out one of the methods described herein. Generally, the methods are preferably carried out by any hardware device.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Laser microdissection system
102 Microscope
104 Microscope foot
106 Illumination unit
108 Condenser unit
110 Operator interface
112 Adjustment knob
114 Microscope stage
116 Examination object
118 Specimen slide
120 Holder
122 Objective
124 Objective turret
126 Protective cover
128 Observation beam path
130 Lens tube unit
132 Coupling-out device
134 Eyepiece pair
136 Image acquisition unit
138 Image analysis unit
140 Laser unit
142 Laser light source
144 Laser beam
146 Incident light unit
148 Deflection mirror
150 Deflection mirror
152 Adjustment device
154 Laser deflection device
156 Wedge plates
160 Control computer
170 Data connection
190 Autofocus system
x Coordinate axis, spatial direction
y Coordinate axis, spatial direction
z Coordinate axis, spatial direction
200 Sample or object
210 Incompletely separated dissectate
212 Cut hole
214 Edge region
220 Object plane
222a . . . 222e Offset focal planes below the sample
224a . . . 224e Offset focal planes above the sample
232 End distance below the sample
234 End distance above the sample
240 Optical axis
300 Change focus
310 Acquire image data
320 Examine image data for sharp structures
330 Examine the end of the focal region
340 End sharpness examination
350 Process information further
360 Recut
400 Object
410 Incompletely separated dissectate
412 Cut hole
414 Edge region
416 Sharp structure
500 Generate reference image data
510 Laser cut
520 Acquire image data after cut
530 Match image data to reference image data
540 Sharpness examination
550 Dissection successful
560 End image examination

What is claimed is:

1. A method for checking a dissection process in a laser microdissection system, the method comprising:
carrying out the dissection process for cutting out a dissectate from an object in a first region of the object by a laser beam;
acquiring first image data of at least the first region of the same object after the dissection process, and
examining on a basis of physical sharpness information whether the first image data has physically sharp structures within a region of a cut hole of the dissectate to be separated by the dissection process in order to determine success of the dissection process,
wherein the first image data of the cut hole in the same object are acquired with a focal plane that is different from an object plane of the region of the cut hole and which is offset in parallel along the optical axis with respect to the object plane.

2. The method according to claim 1, wherein the first image data are acquired with a focal plane lying in an object plane.

3. The method according to claim 1, further comprising:
acquiring second image data after the dissection process with a second offset focal plane offset in parallel along the optical axis and on the opposite side of the object in relation to the first focal plane, and
examining whether the second image data has sharp structures in order to determine success of the dissection process.

4. The method according to claim 1, further comprising:
defining a plurality of offset focal planes offset in parallel along the optical axis to the object plane;
acquiring image data in each of the plurality of offset focal planes; and
examining whether at least one of the image data has sharp structures in order to determine success of the dissection process.

5. The method according to claim 4, wherein the offset focal planes are sequentially approached by stepwise changing of focus of an optical system that generates the image data.

6. The method according to claim 4, further comprising defining an end distance from the object plane, wherein the plurality of offset focal planes are located between the object plane and the end distance.

7. The method according to claim 6, wherein the end distance is at most half of a greatest extent of the dissectate.

8. The method according to claim 1, further comprising comparing image data acquired after the dissection process to reference image data in order to determine success of the dissection process was successful.

9. The method according to claim 8, further comprising generating the reference image data by acquiring initial image data of the first region before carrying out the dissection process.

10. The method according to claim 8, further comprising generating the reference image data by acquiring image data of the first region with at least one offset focal plane before carrying out the dissection process.

11. The method according to claim 8, further comprising generating the reference image data by acquiring image data of a background area without an object.

12. The method according to claim 8, further comprising generating the reference image data by defining threshold values for parameters of the image data, the parameters comprising at least one of the following for at least a subset of the image data: brightness, contrast, frequency distribution, gray value distribution, or color values.

13. The method according to claim 8, further comprising generating the reference image data by acquiring image data of the object outside the first region.

14. The method according to claim 8, further comprising:
acquiring the reference image data before carrying out the dissection process in a second region of the object which includes the first region,
acquiring third image data of the second region after the dissection process; and
comparing the acquired third image data to the reference image data of the second region in order to determine whether the cut-out dissectate is on the object.

15. The method according to claim 1, further comprising at least partially repeating the dissection process if it was determined that the dissection process was unsuccessful.

16. A control unit for a laser microdissection system, wherein the control unit is configured to carry out the method according to claim 1.

17. A tangible, non-transitory computer-readable medium having program code thereon which, upon execution by one or more processors, provide for carrying out the method according to claim 1.

18. A laser microdissection system comprising the control unit according to claim 16, a laser which is configured to carry out the dissection process for cutting the dissectate out of the object, and at least one camera which is configured to acquire the image data of the object.

* * * * *